March 6, 1951  P. C. MATTHIESEN  2,543,978
THERMOSTATIC REGULATOR VALVE
Filed Feb. 12, 1947
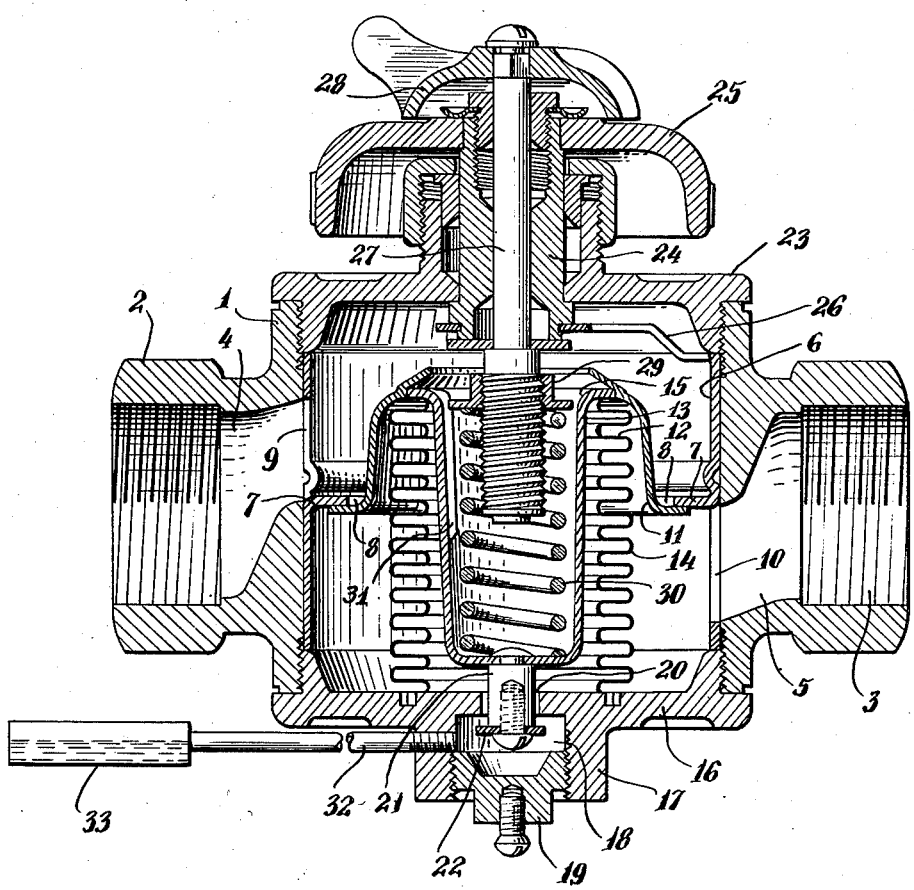
INVENTOR.
Peter Christian Matthiesen
BY
AGENTS.

Patented Mar. 6, 1951

2,543,978

UNITED STATES PATENT OFFICE 2,543,978

THERMOSTATIC REGULATOR VALVE

Peter Christian Matthiesen, Nordborg, Denmark

Application February 12, 1947, Serial No. 728,008
In Denmark June 26, 1945

Section 1, Public Law 690, August 8, 1946
Patent expires June 26, 1965

1 Claim. (Cl. 236—99)

The present invention relates to an automatic regulator valve for radiators or other heating elements in central heating plants, consisting of a valve mechanism housed in a valve casing and actuated by a thermostatic element.

The regulator valves of this kind so far known are subject to the defect that the valve mechanism and especially the more delicate parts thereof will be accessible for inspection, repair and replacement only by a complete or partial draining off of the heating agent from the central heating plant, so that the plant must be put out of action in whole or in part, even if only a refilling or liquid in a single temperature gauge has to be undertaken.

This disadvantage is overcome by the invention by the valve mechanism being mounted inside a rotatable slide valve placed in the valve casing and provided with intake and outlet openings which by the turning of the slide valve may be connected with or shut off from the inlet and outlet openings of the valve-casing for the heating agent. The result is that simply by turning the slide valve it will be possible to shut off entirely from the heating plant, that space in which the valve mechanism is situated; so that without draining off the water from the plant or otherwise disturbing its operation, free access may be obtained for any operation in the space of which the valve mechanism is situated.

In the following the invention is described in detail under reference to the drawing which shows a cross-section through a valve in accordance with the invention.

In the drawing 1 indicates a cylindrical valve casing which on the left side is provided with an inlet connection 2, and on the right side with an outlet connection 3, for a heating medium, usually hot water. The inlet connection may, e. g., be connected with a main pipe in a central heating plant and the outlet connection 3, with a radiator. From the inlet connection 2, a passage 4, opens into the upper left hand part of the valve casing, whereas a passage 5, to the outlet connection 3, leads from the lower right hand part of the valve casing 1. In the valve casing 1, a rotatable slide valve 6 is mounted, fitting tightly up against the wall of the valve casing. The rotatable slide valve 6 is provided with a partition 7, with a central opening 8. Above the partition the slide valve is provided with an inlet 9, and below the partition with an outlet 10. The partition 7 serves as a seat for a bowl shaped valve body 11, which is fastened to or resting against an expansion body 12, consisting of a cup with a surrounding bellows 14, which at the top is tightly connected to a flare collar 15, on the cup 13, while at the bottom it is tightly connected to the bottom cover 16, of the valve casing. On its lower side the cover 16 is provided with a nipple 17, with a recess 18, which is closed by means of a plug 19. The recess 18 is through a bore 20 connected with the interior of the expansion body 12. The recess 18 is further through a pipe 32, connected with a thermostatic element 33, containing a liquid, the vapour pressure of which varying with the temperature will be transmitted to the interior of the expansion body 12. Through the bore 20, a guide tappet 21, attached to the cup 13, is taken with a certain amount of clearance, and this tappet is below the bore 20, provided with a stop plate 22, limiting the movement of the cup 13.

At the top, the valve casing 1 is provided with a cover 23, through which a hollow spindle 24 is taken, which on the outside of the valve casing carries a handle 25, and inside the valve casing is coupled to the slide valve 6, through an arm 26. Through the hollow spindle 24, a spindle 27 is carried, which above the handle 25, carries another handle 28 and which at the bottom is provided with threads which screw into a bushing 29, which presses against a screw spring 30, resting against the bottom of the cup 13. The bushing 29 is provided with a notch engaging a projecting rib 31, on the inner side of the cup 13.

The mode of operation is as follows:

By a heat expansion of the liquid in the thermostatic element the increased vapour pressure will tend to expand the expansion body 12, and thereby press the valve body 11, up against its seat 7, against the pressure of the spring 30. By turning the handle 28, the tension of the spring 30 may be adjusted in such a way that the closing of the valve in this manner will take place at any temperature desired within a suitable range of adjustment. If the temperature drops the valve will again open. By turning the handle 28, it is thus possible to adjust the automatic regulator valve to maintain the desired temperature in the room.

By turning the handle 25, the rotatable slide valve 6 may be turned to such a position that its inlet and outlet openings 9 and 10, do not correspond with the openings of the inlet and outlet passages 4 and 5, and the interior of the valve casing will thus be entirely shut off from the inlet and outlet connections.

The valve mechanism may then be freely dismounted to any extent desired for inspection, repair, or replacement without this work in any way interfering with the operation of the central heating plant of which the automatic regulator valve forms part.

Having now described my invention what I claim as new, and desire to secure by Letters Patent, is:

An automatic valve for heat elements in central heating plants, said valve comprising a housing, a rotary slide member divided by a horizontal wall into two compartments, the upper one of which communicates with an inlet opening in the housing, and the lower one of which communicates with an outlet opening in the housing, a valve member comprising a heat responsive element tending to close said valve and a tensioning spring to open the valve, a cup-shaped member having an outwardly and downwardly extending flange, adapted to cooperate with said horizontal wall, said cup-shaped member being positioned in the interior of said heat responsive element, said tensioning spring being positioned in the interior of said cup-shaped member, a hand operated spindle abutting the said tensioning spring, a stem fixed to the rotary slide member having a central bore, said spindle being positioned in the bore of said stem.

PETER CHRISTIAN MATTHIESEN.

REFERENCES CITED

The following references are of record in the file of this patent:

UNITED STATES PATENTS

| Number | Name | Date |
|---|---|---|
| 1,639,286 | Carson | Aug. 16, 1927 |
| 1,932,404 | Hamblin | Oct. 31, 1933 |
| 2,308,861 | Clifford | Jan. 19, 1943 |